United States Patent [19]

Tran et al.

[11] Patent Number: 5,224,010
[45] Date of Patent: Jun. 29, 1993

[54] POWER SUPPLY SUPERVISOR WITH INDEPENDENT POWER-UP DELAYS AND A SYSTEM INCORPORATING THE SAME

[75] Inventors: Tranh T. Tran, Tomball; Richard E. Walker, The Woodlands, both of Tex.

[73] Assignee: Compaq Computer Corporation, Houston, Tex.

[21] Appl. No.: 748,253

[22] Filed: Aug. 21, 1991

[51] Int. Cl.$^5$ .......................................... H02H 3/027
[52] U.S. Cl. ........................................ 361/90; 361/94
[58] Field of Search ................ 361/86, 87, 90, 91, 361/92, 93, 94

[56] References Cited

U.S. PATENT DOCUMENTS

| | | | |
|---|---|---|---|
| 4,600,962 | 7/1986 | Bliehall | 361/77 |
| 4,638,175 | 1/1987 | Bradford et al. | 307/64 |
| 4,771,356 | 9/1988 | Hastings | 361/92 |
| 4,772,980 | 9/1988 | Curtis et al. | 361/90 |
| 4,951,171 | 8/1990 | Tran et al. | 361/90 |
| 4,980,791 | 12/1990 | Aberkrack et al. | 361/90 |
| 4,999,730 | 3/1991 | Pickard | 361/86 |

Primary Examiner—A. D. Pellinen
Assistant Examiner—Ronald W. Leja
Attorney, Agent, or Firm—Vinson & Elkins

[57] ABSTRACT

A power supply monitoring circuit, and a data processing system incorporating the same together with a regulated power supply and system components such as a CPU, are disclosed. The power supply monitoring circuit includes delay circuits, with the respective delays selected by the selection of capacitor values, for delaying the issuing of a "power-good" signal to the CPU after power-up until sufficient time has passed after establishment of adequate voltages on the power supply bus to allow the power supplies to stabilize, and for ignoring undervoltage faults (in generating a power supply shutdown signal) on said power supplies for a brief period of time after power-up. The stabilization and power-up delay periods may be selected independently from one another, so that the power-up delay can expire prior to the expiration of the stabilization delay. In this way, the power supply can be promptly turned off if an undervoltage condition is present during power-up, reducing the risk of component damage from absence of adequate power supply voltages.

29 Claims, 3 Drawing Sheets

POWER SUPPLY SUPERVISOR WITH INDEPENDENT POWER-UP DELAYS AND A SYSTEM INCORPORATING THE SAME

This invention is in the field of data processing systems, and is more particularly directed to power supply supervisor circuits in such systems.

BACKGROUND OF THE INVENTION

Data processing systems, such as personal computers and workstations, as well as other modern electronic equipment, generally rely on regulated power supplies for the biasing and operation of integrated circuits contained therein. Such regulated power supplies provide stable power supply bias voltages to the various circuit functions in the system, in an effort to reduce loss of data or other functional system errors caused by unstable or varying power supply voltages.

Unstable or indeterminate operation of the components in such systems can also occur during transient operating events, particularly power-up. In addition, a fault in the regulated power supply which causes overvoltage or undervoltage power supply levels can, if applied to system components while operating, cause temporary or permanent failures of the components. Accordingly, power supply monitoring and control circuits have been used in personal computers, workstations, and other electronic systems to monitor the output of the regulated power supply in the system, and to disable components from operating when the output voltages are outside of the desired range.

An example of a prior power supply supervisor circuit is described in our U.S. Pat. No. 4,591,171, issued Aug. 21, 1990, assigned to Compaq Computer Corporation, and incorporated herein by this reference. This prior power supply supervisor circuit monitors the output of a regulated power supply, and disables the system central processing unit (CPU) in the event of overvoltage, undervoltage, or excessively high current output from the power supply. In addition, this power supply supervisor circuit also generates a shutdown signal to the power supply itself in such events, preventing further damage to the data processing system. This circuit includes delay circuits so that the undervoltage condition which occurs during power-up of the regulated power supply does not result in a shutdown signal to the power supply, while immediately producing the shutdown signal in the event of overvoltage and overcurrent conditions occurring during power-up. A delay circuit is also provided to delay the "power-good" signal to the CPU and other components for a selected period of time, allowing the power supply output voltages to stabilize after power-up.

In the circuit described in said U.S. Pat. No. 4,951,171, the power-up delay (i.e., the time period during which undervoltage conditions will not generate a shutdown signal) is designed to be longer than the power-good delay (i.e., the delay of the "power-good" signal), thus ensuring that the power supply does not shut down prematurely during power-up. This configuration is adequate for many components and systems, as many undervoltage conditions on power-up will cause an overcurrent event, responsive to which the circuit immediately issues the shutdown signal. However, in more recent systems, the CPU and other circuit components are fabricated with higher density processes, potentially increasing their sensitivity to undervoltage conditions. Undervoltage conditions of even brief duration can result in damage to such circuits. In particular, some complementary metal-oxide-semiconductor (CMOS) components can enter a "latchup" condition if the negative "back-bias" power supply voltage is inadequate. In these systems, rapid shutdown of the regulated power supply in an undervoltage condition can prevent permanent damage to the integrated circuit components.

In addition, certain short circuit conditions can be present in the system which may not be detected by the circuit of said U.S. Pat. No. 4,951,171. For example, in the circuit of said U.S. Pat. No. 4,951,171, overcurrent detection is not necessarily provided for all power supplies, particularly those which are expected to have minimal load; as such, an output of the regulated power supply may have a "dead" short to ground prior to power-up which may go undetected by the power supply supervisor circuit. Furthermore, in this prior circuit, a short undervoltage condition may occur between the time that the power-good signal is issued and the expiration of the power-up delay. In either of these cases, the undervoltage condition may cause stress or damage to modern sensitive integrated circuit components, but would go undetected by the supervisor circuit.

It is therefore an object of this invention to provide a power supply supervisor circuit for which the power-up delay can be independently selected from the power-good delay.

It is a further object of this invention to provide a power supply supervisor circuit for which the power-up delay can be shorter than the power-good delay, so that a power supply shutdown signal can be generated responsive to an undervoltage condition on power-up.

It is a further advantage of the present invention to provide such a power supply supervisor circuit having an active output driver for generating the power-good signal, improving the ability of the system to quickly respond to successful power-up.

Other objects and advantages of this invention will become apparent to those of ordinary skill in the art having reference to the following specification, together with the drawings.

SUMMARY OF THE INVENTION

The invention may be incorporated into a power supply supervisor circuit for a data processing or other electronic system, in which a first delay circuit is provided to define a stabilization delay period between the detection of an adequate power supply voltage and the generation of a power-good signal to system components, and in which a second delay circuit is provided to define a power-up delay period from the biasing of the supervisor circuit during which undervoltage conditions are ignored in generating the shutdown signal. The stabilization and power-up delay times of the first and second delay circuits may be independently selected, for example by the selection of external capacitor values. As a result, the power-up delay can be shorter than the stabilization delay, so that the regulated power supply can be promptly shut down in the event of undervoltage conditions occurring during power-up.

DETAILED DESCRIPTION OF THE PREFERRED EMBODIMENT

Figure 1:
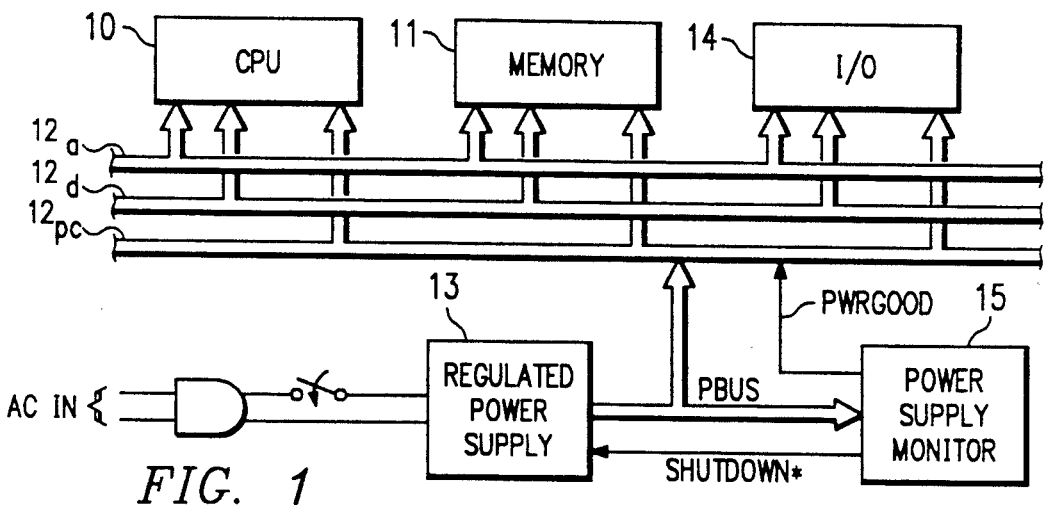
FIG. 1 is an electrical diagram, in block form, of a system incorporating the preferred embodiment of the invention.

Referring now to FIG. 1, a data processing system including power supply supervisor circuit 15 according to the preferred embodiment of the invention will now be described in detail. The system of FIG. 1 includes conventional components or sub-systems therein, such as central processing unit (CPU) 10, memory 11, and input/output function (I/O) 14. Additional or different components may, of course, also be included in such a system. In this example, CPU 10, memory 11 and I/O 14 are interconnected in the conventional manner by way of address bus $12_a$, data bus $12_d$, and power and control bus $12_{pc}$. In particular, power/control bus $12_{pc}$ includes conductors for providing various and multiple power supply voltages to CPU 10, memory 11, and I/O 14, as well as conductors for the communication of control signals thereamong.

As is conventional, regulated power supply 13 converts AC power it receives into the various DC voltages necessary for the operation of the system, and supplies these DC voltages to the power supply lines of power/control bus $12_{pc}$ by way of power bus PBUS. For example, power bus PBUS may include conductors for carrying power supply voltages of +12 volts, +5 volts, ground, −5 volts, and −12 volts to the system components. As is well known in the art, the particular voltages used will depend upon the technology used for the fabrication and design of each of the system components, with not all components necessarily receiving each power supply voltage.

The system of FIG. 1 further includes power supply supervisor circuit 15, which receives the lines of power bus PBUS so that it can monitor the voltages and currents provided thereby. Power supply supervisor 15 generates at least two control signals in the system. A first control signal is communicated on line PWRGOOD to power/control bus $12_{pc}$. The control signal on line PWRGOOD indicates (with a high logic level in this embodiment of the invention) to those ones of CPU 10, memory 11, input/output 14 connected thereto, that the power supply voltages presented by regulated power supply 13 on power bus PBUS are at the proper voltages, and that no power supply fault exists. Accordingly, the high level "power-good" control signal on line PWRGOOD can be used to enable system components such as CPU 10 to operate; conversely, the control signal on line PWRGOOD can be considered as a reset signal, active at a low level, so that the components such as CPU 10 receiving the signal enter a reset, standby, or other non-operating state responsive to line PWRGOOD indicating a fault. Power supply supervisor 15 further presents a control signal to regulated power supply 13 on line SHUTDOWN* which (with a low logic level in this embodiment of the invention) is intended to cause regulated power supply 13 to shut down due to an overvoltage, overcurrent, or undervoltage fault detected by power supply supervisor 15 for one or more of the power supply lines of power bus PBUS.

Figure 2:
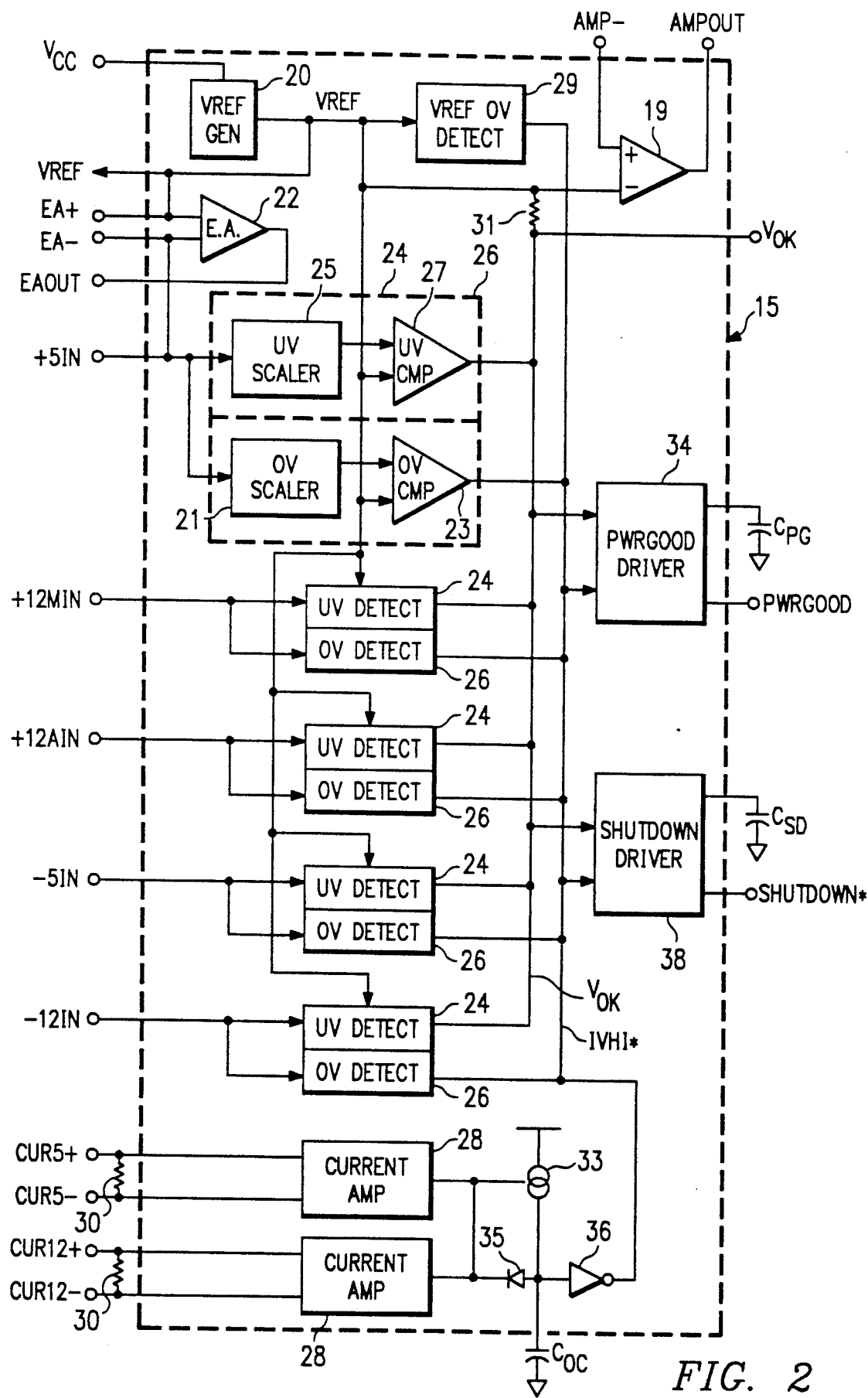
FIG. 2 is an electrical diagram, in block form, of a power supply supervisor circuit according to the preferred embodiment of the invention.

Referring now to FIG. 2, the construction of power supply supervisor 15 will now be described in detail. Power supply supervisor 15 receives its biasing power supply on line $V_{cc}$; power supply $V_{cc}$ is a local power supply used by supervisor 15 in its operation, and is not one of the power supply voltages of power bus PBUS monitored thereby. Power supply supervisor 15 also receives at least one ground or reference (not shown); preferably, one ground reference is used for all noise sensitive circuits such as comparators 24, 26 therein, with a separate isolated ground reference used by the output drivers 34, 38, so that noise from output switching does not readily couple to the comparator circuitry. Power supply supervisor 15 also has inputs for receiving the power supply voltages from power bus PBUS. In this example, five inputs are included in power supply supervisor 15, namely +5IN, +12MIN, +12AIN, −5IN, and −12IN, corresponding to the +5 volt, +12 volt (main and auxiliary), −5 volt, and −12 volt power supply voltages generated by regulated power supply 13.

Power supply supervisor 15 includes reference voltage (VREF) generator 20, which is a conventional reference voltage generator circuit, such as a band-gap reference circuit, for generating a reference voltage VREF based upon the power supply voltage $V_{cc}$. Reference voltage VREF is used, either directly or scaled by voltage dividers or the like, in the monitoring of the power supply voltages from power bus PBUS. In addition, supervisor 15 includes error amplifier 22 which receives reference voltage VREF and power supply +5IN at its inputs, and which generates an error signal on line EAOUT corresponding to the difference therebetween. The reference voltage VREF relative to the +5 volt power supply can thus be externally monitored either directly (lines EA+ and EA−) or differentially (line EAOUT).

In addition, for the convenience of the system designer, power supply supervisor 15 includes a spare differential amplifier 19 which has its non-inverting input connected to receive reference voltage VREF. The inverting input is connected to terminal AMP−, and the output is connected to terminal AMPOUT, and may be used in any way desired by the system designer, for example as a voltage regulator for a voltage level used elsewhere in the system.

In this embodiment of the invention, each of the power supply inputs are monitored for both overvoltage and undervoltage conditions. Accordingly, each of the power supply inputs +5IN, +12MIN, +12AIN, −5IN, and −12IN are connected to an undervoltage detection circuit 24 and an overvoltage detection circuit 26. As illustrated in FIG. 2 for power supply input +5IN, each undervoltage detection circuit 24 includes undervoltage scaler 25 having its output connected to one input of undervoltage comparator 27, with the other input of undervoltage comparator 27 receiving reference voltage VREF. The purpose of undervoltage scaler 25 is to shift the input voltage (or reference voltage VREF, as desired), so that the undervoltage comparator 27 will switch its output responsive to the input voltage falling below a desired undervoltage threshold value. Undervoltage scaler 25 can thus consist of a simple resistor voltage divider, or may include active operational amplifiers for effecting the desired scaling.

Similarly, each overvoltage detection circuit 26 includes overvoltage scaler 21, which receives the power supply input (or alternatively, reference voltage VREF), and which has its output coupled to an input of overvoltage comparator 23; the other input of overvoltage comparator 23 receives the reference voltage VREF (or, alternatively, if reference voltage VREF is scaled, the input voltage). The output of overvoltage comparator 23 is thus set, by way of scaler 21, to switch responsive to the input voltage exceeding a desired overvoltage threshold. In addition to the power supply inputs, supervisor 15 includes reference voltage overvoltage detection circuit 29 which is similarly constructed (i.e., with scaler and comparator), but where reference voltage VREF is compared against an absolute voltage level, for example by way of a zener diode.

Of course, undervoltage and overvoltage detection circuits 24, 26 for the negative power supply inputs −5IN and −12IN will detect the undervoltage and overvoltage condition of the amplitude (rather than the polarity) of the input voltages. This is because an "undervoltage" condition for a negative power supply exists, for purposes of this description, where the negative input power supply voltage is not negative enough, and because an "overvoltage" condition exists for these inputs when their voltage is too far negative.

The outputs of all undervoltage comparators 27 in undervoltage detection circuits 24 are connected together, in wired-OR fashion, at node VOK; pull-up resistor 31 connects node VOK to reference voltage VREF to provide for passive pull-up of this wired-OR node VOK. An output terminal VOK is also provided in this example of supervisor 15 to allow for external monitoring of the result of the undervoltage detection. The outputs of all overvoltage. comparators 23 in overvoltage detection circuits 26, and the output of VREF overvoltage detection circuit 29, are also connected together at node IVHI* (* indicating negative logic, i.e., that an overvoltage condition is present when node IVHI* is low).

Power supply supervisor circuit 15 also includes circuitry for monitoring overcurrent conditions on two of the power supply inputs, for example the +5 volt and +12 volt inputs. Input lines CUR-5+ and CUR5− are connected across a small series resistor 30 in the +5 volt power supply line in power bus PBUS, measuring a differential voltage corresponding to the current sourced by regulated power supply 13. Similarly, a differential voltage is measured by lines CUR12+ and CUR12− across small resistor 30 connected in series in one of the +12 volt power supply lines of power bus PBUS. The measured differential voltages are amplified by current amplifier 28 (the outputs of which are connected together), which control current source 33 according to their , measured differential voltages. The outputs of current amplifiers 28 are isolated from current source 33 by diode 35. The anode of diode 35 is connected to an external capacitor $C_{DC}$ and to the input of inverter 36; the output of inverter 36 is connected to node IVHI* in wired-OR fashion. Accordingly, in the event of an overcurrent condition, current source 33 will rapidly charge capacitor $C_{oc}$ due to one of the measured differential voltages being large, causing inverter 36 to pull node IVHI* low, thus issuing the overcurrent signal.

Accordingly, power supply supervisor 15 is able to monitor both overvoltage and undervoltage conditions on each of the power supply inputs thereto. This improves the monitoring and protection capability of supervisor 15 over that of the circuit described in said U.S. Pat. No. 4,951,171, incorporated herein by reference, which, while monitoring undervoltage for all supplies, monitored overvoltage for only the +5 volt power supply. In addition, power supply supervisor 15 not only detects overcurrent conditions for the +5 volt supply, but also for one of the +12 volt supplies. With the increased use of drivers biased from +12 volt in recent data processing systems, the provision of multiple power supply voltage overcurrent detection included in power supply supervisor 15 is quite beneficial.

Connected both to node VOK and to node IVHI* are power-good driver 34 and shutdown driver 38. Similarly as described in said U.S. Pat. No. 4,951,171, power-good driver 34 presents an output on line PWRGOOD to power and control bus $12_{pc}$, and thus to components such as CPU 10, indicating with a high logic level that the power supply voltages generated by regulated power supply 13 are at appropriate levels (i.e., no overvoltage, undervoltage or overcurrent conditions are present). Shutdown driver 38 presents an output on line SHUTDOWN* to regulated power supply 13 indicating, with a low logic level, that power supply 13 is to shut down due to detection of an overvoltage, undervoltage, or overcurrent condition.

Also similarly to the circuit described in said U.S. Pat. No. 4,951,171, delay periods are incorporated into each of power-good and shutdown drivers 34, 38 to account for the undervoltage condition which necessarily exists during system power-up. For power-good driver 34, the signal on line PWRGOOD is not to be issued until such time as the power supply voltages have stabilized at their appropriate levels, so that system components such as CPU 10, etc. do not operate during such time as their power supply voltages are settling or otherwise varying. This stabilization delay period is determined by the value of external capacitor $C_{pg}$ connected to supervisor 15, as will be noted hereinbelow.

For shutdown driver 38 according to this embodiment of the invention, the signal on line SHUTDOWN* is not to be issued upon detection of an undervoltage condition during powerup, as such a condition is expected. If an overvoltage or overcurrent condition is detected during powerup, however, regulated power supply 13 should be promptly shut down to avoid component and system damage. The power-up delay time during which undervoltage conditions are ignored by shut-down driver 38 is determined by the value of external capacitor $C_{sd}$ connected to supervisor 15, as will also be noted hereinbelow.

According to this embodiment of the invention, the power-up delay time of shutdown driver 38 may be determined independently from the stabilization delay period of powergood driver 34. In addition, as will be further described hereinbelow, the power-up delay time is preferably shorter than the stabilization delay period, and is initiated earlier, upon power-up rather than responsive to node VOK going high, so that an unexpectedly long undervoltage condition during power-up can be detected and the regulated power supply 13 promptly shut down.

Figure 3A:
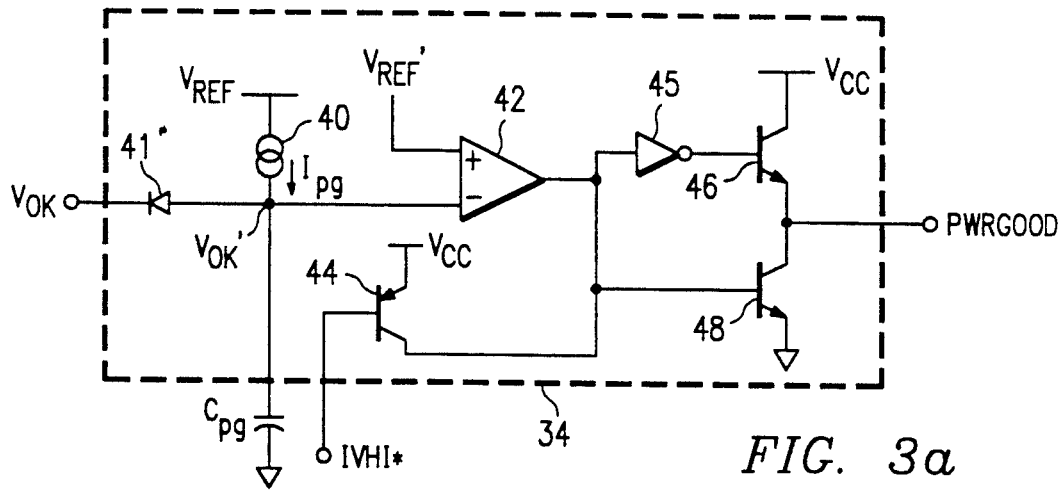
FIG. 3a is an electrical diagram, in schematic form, of portions of the power-good driver in the circuit of FIG. 2.

Referring now to FIG. 3a, the construction of power-good driver 34 will now be described in detail. It should be understood that the schematic diagram of FIG. 3a (and FIG. 3b described hereinbelow) is presented in relatively general terms, for purposes of clarity; conventional voltage divider scaling of levels, as well as resistors for limiting base and collector currents, and for providing the proper bias of the devices therein, are omitted for purposes of clarity. It is contemplated that one of ordinary skill in the art having reference to this description will be able to readily implement the circuits described herein.

Node VOK is coupled to the inverting input of differential amplifier 42 via diode 41; reference voltage VREF' (which may be at the same voltage as reference voltage VREF, or at a voltage scaled therefrom) is applied to the non-inverting input of differential amplifier 42. Diode 41 has its anode coupled to node VOK' (i.e., the inverting input of differential amplifier 42) and its cathode coupled to node VOK, isolating it from the operation of power-good driver 34. In this example, the logic levels at node VOK correspond to conventional TTL levels, suitable for discharging node VOK through diode 41 when low (i.e., one or more of the input power supply voltages in an undervoltage condition) and for reverse-biasing diode 41 when high (i.e., all of the input power supply voltages being at an adequate voltage).

The output of differential amplifier 42 is coupled to a push-pull output driver which includes n-p-n transistors 46, 48 and inverter 45. Inverter 45 inverts the output of amplifier 42 prior to its application to the base of pull-up transistor 46. Transistor 46 has its collector biased to $V_{cc}$ and its emitter coupled to line PWRGOOD of power/control bus $12_{pc}$. The output of amplifier 42 is coupled to the base of pull-down transistor 48, which has its emitter at ground and its collector connected to line PWRGOOD. N-p-n transistors 46, 48 are thus driven by differential amplifier 42 in complementary fashion.

Also connected to the bases of n-p-n transistors 46, 48 (via inverter 45 in the case of transistor 46) is the collector of p-n-p transistor 44. The emitter of transistor 44 is coupled to $V_{cc}$, and its base receives the signal on line IVHI* from overvoltage detection circuits 26, 29 and overcurrent inverter 36. Accordingly, with line IVHI* high (i.e., no overvoltage or overcurrent fault), the output of differential amplifier 42 wall control the state of the signal on line PWRGOOD. However, if an overvoltage or overcurrent fault is detected, such that line IVHI* is at a low level, transistor 44 will be on, and a low logic level will be driven by powergood driver 34 (n-p-n transistor 46 turning off via inverter 45, and n-p-n transistor 48 turning on).

The stabilization delay of powergood amplifier 34 is determined by current source 40, coupled between reference voltage VREF and node VOK' and providing a stable current $I_{pg}$. External capacitor $C_{pg}$ is coupled between node VOK' and ground. The stabilization delay $t_{pg}$ is determined by the time required for current source 40 to charge capacitor $C_{pg}$, beginning with line VOK indicating that all power supplies are above their undervoltage thresholds (i.e., upon diode 41 becoming reverse-biased). Stabilization delay $t_{pg}$ is determined according to the following relationship:

$$t_{pg} = C_{pg} * (VREF/I_{pg})$$

For the case of a modern data processing system, the preferred value of capacitor $C_{pg}$ is on the order of 0.47 μF, reference voltage VREF' is on the order of 4.8 volts, and charging current $I_{pg}$ is on the order of 6.0 μA; this results in a nominal stabilization delay time $t_{pg}$ of on the order of approximately 376 msec.

Prior to the elapse of time $t_{pg}$, during which capacitor $C_{pg}$ is being charged by current source 40, the inverting input to differential amplifier 42 will be low (i.e., below the voltage VREF') regardless of the level of node VOK. Therefore, during this time the level of line PWRGOOD will be held low, as amplifier 42 will turn n-p-n transistor 48 on and n-p-n transistor 46 off. Accordingly, no powergood signal can issue to the system components during the stabilization period.

After the elapse of the time $t_{pg}$, the state of line VOK and of line IVHI* will determine the state of line PWRGOOD. If line VOK goes low, capacitor $C_{pg}$ will discharge thereto and quickly cause line PWRGOOD to be driven low; if line IVHI* goes low, transistor 44 will rapidly turn on and line PWRGOOD will be pulled low by transistor 48. If either of these conditions occur prior to the elapse of time $t_{pg}$, a high level on line PWRGOOD will never issue.

Figure 3B:
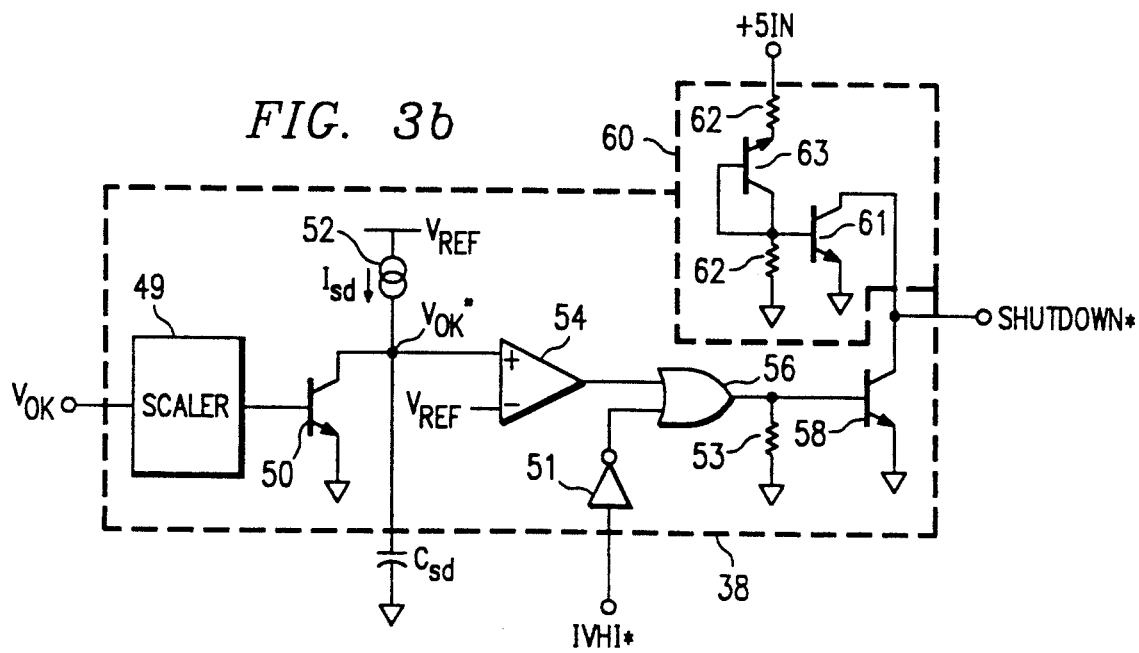
FIG. 3b is an electrical diagram, in schematic form, of portions of the shutdown driver in the circuit of FIG. 2.

Referring now to FIG. 3*b*, the construction of shutdown driver 38 according to this embodiment of the invention will now be described in detail. N-p-n transistor 50 has its base coupled to node VOK, via scaler 49 (which, as noted hereinabove, may be a voltage divider or other conventional level shifting circuit). The collector of transistor 50 is connected to the non-inverting input of differential amplifier 54 at node VOK'', and the emitter of transistor 50 is connected to ground. The inverting input of differential amplifier 54 receives reference voltage VREF (either directly, or shifted by a voltage divider or the like). As in the case of powergood driver 34, the scaling or shifting of reference voltage VREF or of node VOK is set so that differential amplifier 54 switches at the appropriate voltage of node VOK. The output of amplifier 54 is connected to one input of OR gate 56.

Line IVHI* is connected to another input of OR gate 56, after inversion by inverter 51. The output of OR gate 56 is applied to the base of n-p-n transistor 58, which has its emitter coupled to ground and its collector connected to line SHUTDOWN*. Line SHUTDOWN* is thus an open-collector output, with external pull-up and bias recommended.

In addition, shutdown driver 38 includes sub-circuit 60 which is operable to generate the shutdown signal by pulling line SHUTDOWN* low in the event an overvoltage condition exists with $V_{cc}$ absent. The emitter of transistor 63 is coupled to a power supply input, for example the +5IN input, with its base and collector connected in common to the base of pull-down transistor 61; current limiting and bias resistors 62 are included in the conventional manner. Transistor 61 has its collector connected to line SHUTDOWN*, in wired-OR fashion with transistor 58, and has its emitter at ground. Accordingly, even if the $V_{cc}$ power supply is absent, if power supply input +5IN exceeds the voltage to which open-collector output line SHUTDOWN* is externally biased, transistor 61 will turn on and pull line SHUTDOWN* low, shutting down regulated power supply 13.

The power-up delay time ($t_{sd}$) of shutdown driver 38 is determined by current source 52, which is connected between reference voltage VREF and node VOK'' and which provides a current $I_{sd}$, and by the value of external capacitor $C_{sd}$ connected between node VOK'' and ground. Power-up delay time $t_{sd}$ is the time required for capacitor $C_{sd}$ to be charged by current source 52 to a voltage sufficient to switch differential amplifier 54; this voltage will be at approximately reference voltage VREF. Since line VOK is initially low during powerup and transistor 50 is initially off, power-up delay time $t_{sd}$ begins upon reference voltage VREF reaching a sufficiently high voltage so that current source 52 begins functioning. Accordingly, power-up delay time $t_{sd}$ is determined as follows:

$$t_{sd} = C_{sd} * (VREF/I_{sd})$$

For the case of a modern data processing system, the preferred value of capacitor $C_{sd}$ is on the order of 0.047 μF, reference voltage VREF is on the order of 5.075 volts, and charging current $I_{sd}$ is on the order of 6.15 μA; this results in a nominal power-up delay time $t_{sd}$ of approximately 40 msec.

Upon power-up of supervisor 15 and the system, and until power-up delay time $t_{sd}$ has elapsed, node VOK" at the non-inverting input to amplifier 54 will remain below the switching threshold of amplifier 54, regardless of the state of node VOK at the outputs of undervoltage detection circuits 24. As a result, the undervoltage condition which necessarily exists on power-up (causing node VOK to be low) is ignored by shutdown driver 38. However, prior to the elapse of power-up delay time $t_{sd}$, OR gate 56 can still respond to the state of line IVHI* (via inverter 51), so that in the event of an overvoltage or overcurrent condition, transistor 58 can be turned on and the shutdown signal issued to regulated power supply 13. If node VOK goes high during power-up delay time $t_{sd}$, however, capacitor $C_{sd}$ will discharge through transistor 50 from whatever voltage it has been charged to, and the non-inverting input to amplifier 54 will never reach the switching voltage. Conversely, if node VOK does not go high prior to the expiration of power-up delay time $t_{sd}$, the voltage on node VOK" will reach a sufficient level to switch amplifier 54, causing OR gate 56 to turn on transistor 58 and issue the shutdown signal on line SHUTDOWN* to regulated power supply 13.

In the event that power-up has been successful, node VOK will be high, turning on transistor 50 and holding node VOK" low. Upon detection of an undervoltage condition by one of undervoltage detection circuits 24, node VOK will then be driven low, turning off transistor 50 in shutdown driver 38. Capacitor $C_{sd}$ will then be charged up by current source 52 and, if the undervoltage condition is not cleared before the elapse of delay time $t_{sd}$ from the discharge of capacitor $C_{sd}$, amplifier 54 will switch and the shutdown signal issued. The delay time $t_{sd}$ prior to issuance of the shutdown signal after power-up is not expected to adversely affect the system or its components, as this delay is preferably quite short (on the order of 40 msec).

According to the present invention, the shutdown delay time $t_{sd}$ is selected independently from the stabilization delay time $t_{pg}$, according to the values of capacitors $C_{sd}$ and $C_{pg}$. In contrast to the circuit described in said U.S. Pat. No. 4,951,171 where the power-up delay time is at least as long as the stabilization delay, the shutdown delay time $t_{sd}$ is preferably shorter than the stabilization delay time $t_{pg}$. For example, a preferred stabilization delay time $t_{pg}$ for a modern conventional system is on the order of 200 to 500 msec from node VOK going high, preferably about 400 msec. For conventional power supplies operated according to their load specifications, the outputs can be expected to reach an adequate voltage quite rapidly, within on the order of 10 msec from initial power-up; accordingly, a preferred power-up delay time $t_{sd}$ is on the order of 20 to 200 msec from power-up, preferably 40 msec, such a delay time being significantly shorter than the stabilization delay time $t_{pg}$ noted above. Alternatively, since the power-up delay time $t_{sd}$ begins from power-up and since the stabilization delay time $t_{pg}$ begins from node VOK going high, the power-up delay time $t_{sd}$ may be as long as, or even longer than, the stabilization delay time $t_{pg}$ while still obtaining the benefits of the invention, so long as the power-up delay time $t_{sd}$ expires prior to the expected expiration of the stabilization delay time $t_{pg}$.

With these selected delay periods, regulated power supply 13 can be promptly shut down in the event of a short circuit or other fault which prevents one or more of the power supply lines of power bus PBUS from reaching an adequate voltage, such shutdown not depending upon any stabilization delay period. The risk of system component damage due to such faults is thus reduced by supervisor 15 according to the present invention.

Figure 4A:
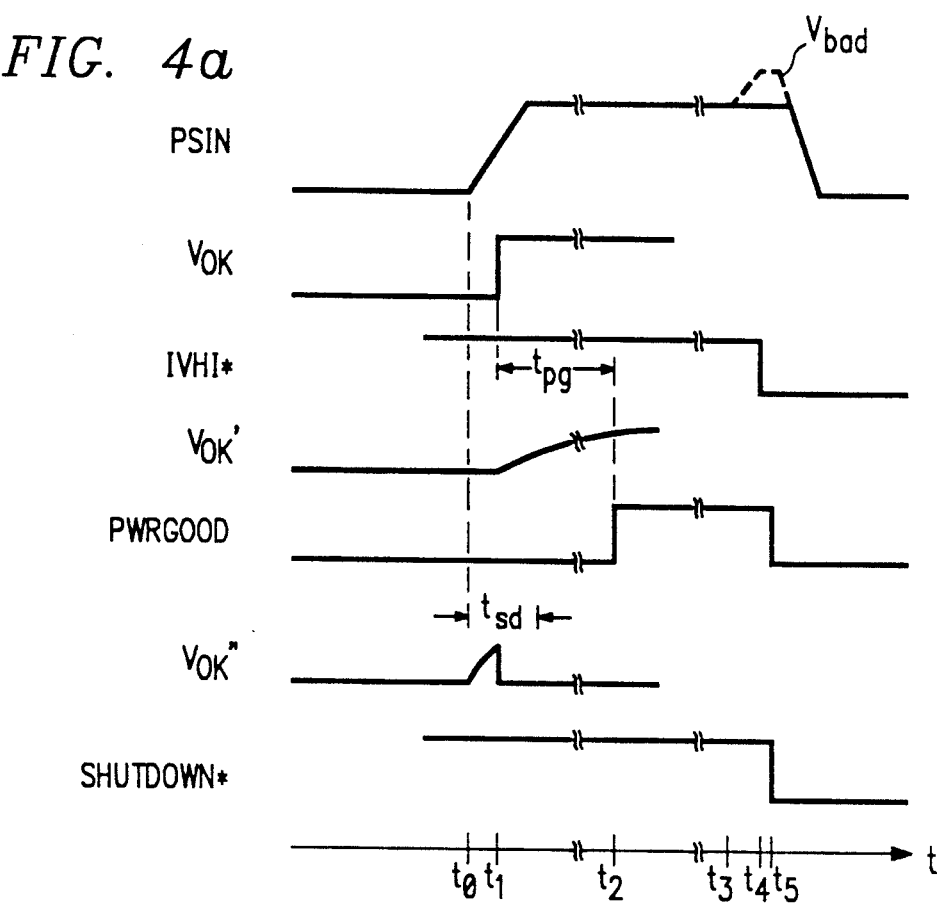
FIGS. 4a and 4b are timing diagrams illustrating the operation of the circuit of FIG. 2.

Referring now to FIG. 4a, the operation of supervisor 15 according to this embodiment of the invention will be described in connection with a successful power-up sequence, followed by an overvoltage power supply fault. At time $t_0$, system power-up is initiated, with the $V_{cc}$ power supply applied to supervisor 15 and the other power supply voltages on power bus PBUS (illustrated generically by line PSIN in FIG. 4a) being powered up. During power-up, line VOK in supervisor 15 will be low, since all of the monitored power supplies are in an undervoltage condition. As the $V_{cc}$ power supply is powered up to the extent that VREF generator 20 (FIG. 2) begins generating a reference voltage, capacitor $C_{sd}$ external to shutdown driver 38 is charged by current source 52, and the voltage at node VOK" begins rising as shown in FIG. 4a. The power-up delay period $t_{sd}$ thus begins shortly after the power-up. During this power-up delay period, since the voltage at node VOK" is below the switching threshold of amplifier 54 (and since no overvoltage or overcurrent condition exists), transistor 58 is held off by OR gate 56, keeping terminal SHUTDOWN* at a high-impedance state (i.e., not pulled low). No shutdown signal is thus presented by supervisor 15 to regulated power supply 13 at this time, allowing it to power up the power supply lines in power bus PBUS.

In the case of a successful power-up, once all of the monitored power supplies have crossed their respective undervoltage thresholds, node VOK is pulled high to reference voltage VREF through pull-up resistor 31, shown at time $t_1$ of FIG. 4a. This causes transistor 50 in shutdown driver 38 to turn on, discharging capacitor $C_{sd}$ therethrough. Since capacitor $C_{sd}$ has discharged prior to the expiration of power-up delay time $t_{sd}$, amplifier 54 does not switch and, in the absence of an overvoltage or overcurrent condition, transistor 58 remains off and line SHUTDOWN* remains at a high-impedance state, keeping regulated power supply 13 enabled for normal system operation.

Once node VOK is pulled high, diode 41 in power-good driver 34 is reverse-biased, allowing capacitor $C_{pg}$ to be charged from current source 40, and initiating stabilization delay time $t_{pg}$. As noted hereinabove, stabilization delay time $t_{pg}$ may be significantly longer than power-up delay time $t_{sd}$ (e.g., on the order of 400 msec, versus on the order of 40 msec for time $t_{sd}$), and is determined by the selection of the value of capacitor $C_{pg}$ so as to be sufficient to allow the power supply voltages on power bus PBUS to stabilize. At time $t_2$, capacitor $C_{pg}$ has reached the switching voltage of amplifier 42, which turns on transistor 46 (via inverter 45) and turns off transistor 48, thus issuing the high level power-good signal on line PWRGOOD. This signal is communicated to CPU 10 and other system components, via power/control bus $12_{pc}$ (FIG. 1), enabling their operation.

Still referring to FIG. 4a, the operation of supervisor 15 in the event of an overvoltage condition occurring after power-up will now be described. The operation of supervisor 15 to an overcurrent condition will be similar to that described herein, with the additional delay in generation of the IVHI* signal as noted hereinabove relative to the description of the overcurrent detection circuitry. In this example, after stable operation of regulated power supply 13, one of the power supply lines in power bus PBUS begins an overvoltage excursion at time $t_3$ (shown as line $V_{bad}$ in FIG. 4a). Upon the voltage of power supply $V_{bad}$ exceeding its overvoltage threshold, its overvoltage detection circuit 26 pulls node IVHI* to a low logic level; in the event of an overcurrent excursion, inverter 36 would similarly pull node IVHI* low after the delay period.

Powergood driver 34 responds to the low logic level on node IVHI* by the turning on of p-n-p transistor 44 which, in turn, turns on transistor 48 and turns off transistor 46 (via inverter 45). Line PWRGOOD is thus pulled to a low logic level (at time $t_4$). which, via power/control bus $12_{pc}$, disables components such as CPU 10 from operating. Shutdown driver 38 responds to the overvoltage condition by way of OR gate 56, which presents a high logic level at its output responsive to line IVHI* being low (inverted by inverter 51). A high logic level at the output of OR gate 56 turns on transistor 58, pulling line SHUTDOWN* low (also shown at time $t_4$), indicating to regulated power supply 13 that it is to shut down (completed at time $t_5$). The time between the issuing of the low level signals on lines PWRGOOD and SHUTDOWN* after line IVHI* goes low is only the propagation delay through powergood driver 34 and shutdown driver 38, respectively, which is quite short, minimizing the risk of damage to components connected to the failed power supply.

As noted hereinabove, if an overvoltage or overcurrent condition is detected during power-up (i.e., during either power-up delay $t_{sd}$ or stabilization delay $t_{pg}$), the operation of supervisor 15 will be the same as in the case of such a fault occurring after power-up. This is because the delays in each of powergood driver 34 and shutdown driver 38 do not affect their response to line IVHI* going low. As a result, an overvoltage or overcurrent condition during power-up will preclude the generation of a high level on line POWERGOOD, and a low level will be immediately generated on line SHUTDOWN*.

Figure 4B:
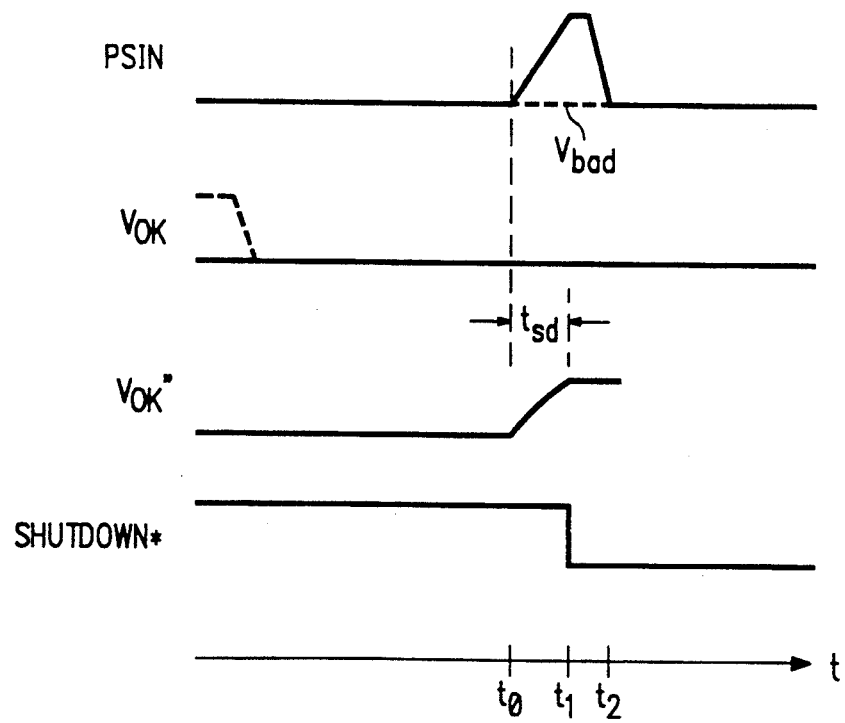

Referring now to FIG. 4b, the operation of supervisor 15 will now be described relative to the situation where one of the power supply lines in power bus PBUS does not adequately power-up (i.e., it remains in an undervoltage condition). At time $t_0$, system power-up is beginning in the same manner as described hereinabove relative to FIG. 4a, except that one of the power supply lines of power bus PBUS (shown as $V_{bad}$) is failing to power-up due to a short circuit to ground or other fault. As in the prior case, beginning at time $t_0$, node VOK will be at a low logic level and capacitor $C_{sd}$ begins to be charged from current source 52. Accordingly, the voltage at node VOK" begins to rise as shown in FIG. 4a, and power-up delay time $t_{sd}$ begins.

However, due to power supply $V_{bad}$ remaining in an undervoltage condition, node VOK remains pulled low by its associated undervoltage detection circuit 24, and accordingly transistor 50 in shutdown driver 38 is not turned on to discharge capacitor $C_{sd}$. Current source 52 continues to charge capacitor $C_{sd}$ until it reaches the switching level of amplifier 54 (VREF, as described hereinabove) at the end of power-up delay time $t_{sd}$ (occurring at time $t_1$ of FIG. 4b). Amplifier 54 drives its output high at this time, which causes OR gate 56 to turn on transistor 58 and pull low line SHUTDOWN*. The low level on line SHUTDOWN* disables regulated power supply 13, causing it to shut down (completed at time $t_2$). Of course, since node VOK never was driven high, a high level does not appear on line PWRGOOD.

This prompt shutdown of regulated power supply 13 due to an undervoltage condition detected during power-up provides significant improvements in the protection of sensitive system components. In particular, many modern integrated circuits may be damaged if certain power supply voltages are applied thereto in the absence of others. For example, CMOS circuits which require a so-called back-bias can enter a latchup condition if positive power supply voltages are applied thereto without sufficient substrate back-bias. In addition, other components can be damaged by excessive currents drawn if a short circuit condition exists (and if no overcurrent monitoring is being performed); power supply shutdown in such cases can reduce the risk of this damage. In any case, rapid shutdown of regulated power supply 13 due to an undervoltage condition during power-up, rather than waiting for the expiration of the stabilization delay period as done in prior circuits, reduces the risk of component damage since the duration of the undervoltage condition is reduced significantly.

While the invention has been described herein relative to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

We claim:

1. A power supply supervisor circuit, comprising:
    a first undervoltage detection circuit, having an input for receiving a first monitored power supply voltage, and having an output, for monitoring said first monitored power supply voltage to determine if an undervoltage condition exists;
    a powergood driver, having an input coupled to said output of said first undervoltage detection circuit, for generating a powergood signal responsive to said first undervoltage detection circuit indicating that no undervoltage condition exists;
    a powergood delay circuit, for disabling said powergood driver from generating said powergood signal for a first delay period after said first undervoltage detection circuit indicates that no undervoltage condition exists;
    a shutdown driver, having an input coupled to the output of said first undervoltage detection circuit, for generating a shutdown signal responsive to said first undervoltage detection circuit indicating that an undervoltage condition exists for said first monitored power supply voltage; and a shutdown delay circuit, for disabling said shutdown driver from generating said shutdown signal responsive to said first undervoltage detection circuit indicating an undervoltage condition during a second delay period after power up of said supervisor circuit;

wherein said second delay period is selected so that it expires prior to the expiration of said first delay period.

2. The circuit of claim 1, further comprising:

a second undervoltage detection circuit, having an input for receiving a second monitored power supply voltage, and having an output, for monitoring said second monitored power supply voltage to determine if an undervoltage condition exists;

wherein said powergood driver also receives the output of said second undervoltage detection circuit so that said powergood signal is generated responsive to said first and second undervoltage detection circuits indicating that no undervoltage condition exists for either said first or second monitored power supply voltages;

wherein said first delay period during which said powergood delay circuit disables said powergood driver is after said first and second undervoltage detection circuits indicating that no undervoltage condition exists for either said first or second monitored power supply voltages;

and wherein said shutdown driver also receives the output of said second undervoltage detection circuit so that said shutdown signal is generated responsive to either said first or said second undervoltage detection circuits indicating that an undervoltage condition exists for said first or second monitored power supply voltage, respectively.

3. The circuit of claim 2, wherein the outputs of said first and second undervoltage detection circuits are connected together in wired-OR fashion;

and wherein said powergood driver and said shutdown driver each receive, at an input, the wired-OR outputs of said first and second undervoltage detection circuits.

4. The circuit of claim 1, further comprising:

a first overvoltage detection circuit, having an input for receiving said first monitored power supply voltage, and having an output, for monitoring said first monitored power supply voltage to determine if an overvoltage condition exists;

wherein said powergood driver has an input for receiving the output of said first overvoltage detection circuit, and is for generating said powergood signal responsive to said first undervoltage detection circuit indicating that no undervoltage condition exists in combination with said first overvoltage detection circuit indicating that no overvoltage condition exists;

and wherein said shutdown driver has an input for receiving the output of said first overvoltage detection circuit, and is also for generating said shutdown signal responsive to said first overvoltage detection circuit indicating that an overvoltage condition exists.

5. The circuit of claim 4, wherein said shutdown driver generates said shutdown signal responsive to said first overvoltage detection circuit indicating that an overvoltage condition exists during said second delay period.

6. The circuit of claim 2, further comprising:

first and second overvoltage detection circuits, each having an input for receiving said first monitored power supply voltage, respectively, and having an output, for monitoring said first and second monitored power supply voltages, respectively, to determine if an overvoltage condition exists;

wherein said powergood driver has an input for receiving the outputs of said first and second overvoltage detection circuits, and is for generating said powergood signal responsive to said first and second undervoltage detection circuits indicating that no undervoltage condition exists, in combination with said first and second overvoltage detection circuits indicating that no overvoltage condition exists;

and wherein said shutdown driver has an input for receiving the outputs of said first and second overvoltage detection circuits, and is also for generating said shutdown signal responsive to either of said first and second overvoltage detection circuits indicating that an overvoltage condition exists.

7. The circuit of claim 1, further comprising:

an overcurrent detection circuit having a first input for receiving a first input signal corresponding to a first monitored current, and having an output for generating an overcurrent signal responsive to said first monitored current being excessive over a selected delay period;

wherein said powergood driver has an input for receiving the output of said overcurrent detection circuit, and is for generating said powergood signal responsive to said first undervoltage detection circuit indicating that no undervoltage condition exists in combination with said overcurrent detection circuit indicating that no overcurrent condition exists;

and wherein said shutdown driver has an input for receiving the output of said overcurrent detection circuit, and is also for generating said shutdown signal responsive to said overcurrent detection circuit generating said overcurrent signal.

8. The circuit of claim 7, wherein said overcurrent detection circuit has a second input for receiving a second input signal corresponding to a second monitored current, so that said overcurrent signal is generated responsive to either said first or said second monitored current being excessive over a selected delay period.

9. The circuit of claim 1, wherein said powergood delay circuit comprises:

a first current source, coupled between a first reference voltage and a first delay node; and a first capacitor, coupled between said first delay node and a second reference voltage;

and wherein said powergood driver comprises:

a first amplifier, having an input coupled to said first delay node, and having an output for generating said powergood signal;

and wherein the input of said powergood driver is coupled to said delay node in such a manner that, responsive to said first undervoltage detection circuit indicating that no undervoltage condition exists, said current source charges said capacitor so that, at the expiration of said first delay period, said first amplifier generates said powergood signal.

10. The circuit of claim 9, wherein said first undervoltage detection circuit, said powergood driver and said powergood delay circuit are formed in a single integrated circuit;

and wherein said first capacitor is connected externally to said integrated circuit, to allow for selection of said first delay period.

11. The circuit of claim 9, further comprising:
a push-pull output driver, having its input coupled to the output of said first amplifier, for generating said powergood signal responsive thereto.

12. The circuit of claim 9, wherein said shutdown delay circuit comprises:
a second current source, coupled between a circuit power supply node and a second delay node; and
a second capacitor, coupled between said second reference voltage and said second delay node;
wherein said shutdown driver comprises:
a second amplifier, having an input coupled to said second delay node and having an output for generating said shutdown signal;
and wherein the input of said shutdown driver is coupled to said second delay node in such a manner that said first undervoltage detection circuit discharges said second capacitor responsive to said first monitored power supply voltage exceeding an undervoltage limit, said second current source being operable to charge said second capacitor from said circuit power supply node to a voltage sufficient to cause said second amplifier to generate said shutdown signal unless said second capacitor is discharged prior to the expiration of said second delay period.

13. The circuit of claim 1, wherein said shutdown delay circuit comprises:
a second current source, coupled between a circuit power supply node and a second delay node; and
a second capacitor, coupled between said second reference voltage and said second delay node;
wherein said shutdown driver comprises:
a second amplifier, having an input coupled to said second delay node and having an output for generating said shutdown signal;
and wherein the input of said shutdown driver is coupled to said second delay node in such a manner that said first undervoltage detection circuit discharges said second capacitor responsive to said first monitored power supply voltage exceeding an undervoltage limit, said second current source being operable to charge said second capacitor from said circuit power supply node to a voltage sufficient to cause said second amplifier to generate said shutdown signal unless said second capacitor is discharged prior to the expiration of said second delay period.

14. The circuit of claim 13, wherein said first undervoltage detection circuit, said powergood driver said powergood delay circuit, said shutdown driver and said shutdown delay circuit are formed in a single integrated circuit;
and wherein said first and second capacitors are connected externally to said integrated circuit, to allow for selection of said first and second delay periods, respectively.

15. A data processing system, comprising:
a system component, having an enable input;
a power supply, for generating a plurality of power supply voltages on a power bus coupled to said system component, said power supply having a shutdown input; and
a power supply supervisor circuit, having inputs coupled to said power bus, having a powergood output coupled to said enable input of said system component, and having a shutdown output coupled to said shutdown input of said power supply, comprising:
a first undervoltage detection circuit, having an input for receiving a first power supply voltage from said power bus, and having an output, for monitoring said first power supply voltage to determine if an undervoltage condition exists;
a powergood driver, having an input coupled to said output of said first undervoltage detection circuit, for generating a signal at said powergood output responsive to said first undervoltage detection circuit indicating that no undervoltage condition exists;
a powergood delay circuit, for disabling said powergood driver from generating said signal for a first delay period after said first undervoltage detection circuit indicates that no undervoltage condition exists;
a shutdown driver, having an input coupled to the output of said first undervoltage detection circuit, for generating a signal at said shutdown output responsive to said first undervoltage detection circuit indicating that an undervoltage condition exists for said first power supply voltage; and
a shutdown delay circuit, for disabling said shutdown driver from generating said shutdown signal responsive to said first undervoltage detection circuit indicating an undervoltage condition during a second delay period after power up of said power supply;
wherein said second delay period is selected so that it expires prior to the expiration of said first delay period.

16. The system of claim 15, wherein said supervisor circuit further comprises:
a second undervoltage detection circuit, having an input for receiving a second power supply voltage from said power bus, and having an output, for monitoring said second power supply voltage to determine if an undervoltage condition exists;
wherein said powergood driver also receives the output of said second undervoltage detection circuit so that said powergood signal is generated responsive to said first and second undervoltage detection circuits indicating that no undervoltage condition exists for either said first or second power supply voltages;
wherein said first delay period during which said powergood delay circuit disables said powergood driver is after said first and second undervoltage detection circuits indicating that no undervoltage condition exists for either said first or second monitored power supply voltages;
and wherein said shutdown driver generates said shutdown signal responsive to either said first or said second undervoltage detection circuits indicating that an undervoltage condition exists for said first or second power supply voltage, respectively.

17. The system of claim 15, wherein said supervisor circuit further comprises:
a first overvoltage detection circuit, having an input for receiving said first power supply voltage, and having an output, for monitoring said first power supply voltage to determine if an overvoltage condition exists;
wherein said powergood driver has an input for receiving the output of said first overvoltage detection circuit, and is for generating said powergood signal responsive to said first undervoltage detection circuit indicating that no undervoltage condition exists in combination with said first overvoltage detection circuit indicating that no overvoltage condition exists;

wherein said shutdown driver has an input for receiving the output of said first overvoltage detection circuit, and is also for generating said shutdown signal responsive to said first overvoltage detection circuit indicating that an overvoltage condition exists;

and wherein said shutdown driver generates said shutdown signal responsive to said first overvoltage detection circuit indicating that an overvoltage condition exists during said second delay period.

18. The system of claim 15, wherein said supervisor circuit further comprises:
an overcurrent detection circuit having a first input for receiving a first input signal corresponding to the current sourced by said power supply in supplying said first power supply voltage, said overcurrent detection circuit having an output for generating an overcurrent signal responsive to said sourced current being excessive over a selected delay period;
wherein said powergood driver has an input for receiving the output of said overcurrent detection circuit, and is for generating said powergood signal responsive to said first undervoltage detection circuit indicating that no undervoltage condition exists in combination with the absence of said overcurrent signal;
and wherein said shutdown driver has an input for receiving the output of said overcurrent detection circuit, and is also for generating said shutdown signal responsive to said overcurrent detection circuit generating said overcurrent signal.

19. The system of claim 15, wherein said powergood delay circuit comprises:
a first current source, coupled between a first reference voltage and a first delay node; and
a first capacitor, coupled between said first delay node and a second reference voltage;
and wherein said powergood driver comprises:
a first amplifier, having an input coupled to said first delay node, and having an output for generating said powergood signal;
and wherein the input of said powergood driver is coupled to said delay node in such a manner that, responsive to said first undervoltage detection circuit indicating that no undervoltage condition exists, said current source charges said capacitor so that, at the expiration of said first delay period, said first amplifier generates said powergood signal.

20. The system of claim 19, wherein said shutdown delay circuit comprises:
a second current source, coupled between a circuit power supply line in said power bus and a second delay node; and
a second capacitor, coupled between said second reference voltage and said second delay node;
wherein said shutdown driver comprises:
a second amplifier, having an input coupled to said second delay node and having an output for generating said shutdown signal;
and wherein the input of said shutdown driver is coupled to said second delay node in such a manner that said first undervoltage detection circuit discharges said second capacitor responsive to said first monitored power supply voltage exceeding an undervoltage limit, said second current source being operable to charge said second capacitor from said circuit power supply line to a voltage sufficient to cause said second amplifier to generate said shutdown signal unless said second capacitor is discharged prior to the expiration of said second delay period.

21. The system of claim 15, wherein said shutdown delay circuit comprises:
a second current source, coupled between a circuit power supply line in said power bus and a second delay node; and
a second capacitor, coupled between said second reference voltage and said second delay node;
wherein said shutdown driver comprises:
a second amplifier, having an input coupled to said second delay node and having an output for generating said shutdown signal;
and wherein the input of said shutdown driver is coupled to said second delay node in such a manner that said first undervoltage detection circuit discharges said second capacitor responsive to said first monitored power supply voltage exceeding an undervoltage limit, said second current source being operable to charge said second capacitor from said circuit power supply line to a voltage sufficient to cause said second amplifier to generate said shutdown signal unless said second capacitor is discharged prior to the expiration of said second delay period.

22. The system of claim 21, wherein said first undervoltage detection circuit, said powergood driver said powergood delay circuit, said shutdown driver and said shutdown delay circuit are formed in a single integrated circuit;
and wherein said first and second capacitors are connected externally to said integrated circuit, to allow for selection of said first and second delay periods, respectively.

23. A method of monitoring and controlling the operation of a power supply in a data processing system, comprising the steps of:
powering up said power supply in said system so that said power supply generates power supply voltages on a power bus;
monitoring at least a first power supply voltage to determine if it is above an undervoltage level;
after the expiration of a power-up delay period beginning with said powering up step, generating a shutdown signal to said power supply if said first power supply voltage has not reached said undervoltage level;
after the expiration of a stabilization delay period beginning at such time as said first power supply voltage reaches said undervoltage level, said stabilization delay period expiring after said power-up delay period, generating a powergood signal to a component in said system.

24. The method of claim 23, wherein said monitoring step monitors a plurality of power supply voltages generated by said power supply, each of said monitored power supply voltages having an undervoltage level;
wherein said shutdown signal to said power supply is generated if any of said monitored power supply voltages has not reached said undervoltage level after the expiration of said power-up delay period;
and wherein said stabilization delay period begins at such time as the last of said monitored power supply voltages reaches its undervoltage level.

25. The method of claim 24, further comprising:

after said step of generating said powergood signal, generating said shutdown signal responsive to any of said monitored power supply voltages falling below its undervoltage level.

26. The method of claim 25, further comprising:
after said step of generating said powergood signal, removing said powergood signal responsive to any of said monitored power supply voltages falling below its undervoltage level.

27. The method of claim 23, further comprising:
monitoring said first power supply voltage to determine if it is above an overvoltage level; and
generating said shutdown signal responsive to said first power supply voltage exceeding said overvoltage level prior to the expiration of said power-up delay.

28. The method of claim 23, further comprising:
monitoring the current sourced by said power supply in supplying said first power supply voltage to determine if said sourced current is above an overcurrent level; and
generating said shutdown signal responsive to said sourced current exceeding said overcurrent level prior to the expiration of said power-up delay.

29. The method of claim 23, further comprising:
selecting the duration of said power-up and stabilization delays, wherein the duration of said power-up delay does not depend upon the duration of said stabilization delay.

* * * * *